(12) United States Patent
Christman et al.

(10) Patent No.: US 7,479,970 B2
(45) Date of Patent: *Jan. 20, 2009

(54) SYSTEMS AND METHODS THAT FACILITATE PROCESS MONITORING, NAVIGATION, AND PARAMETER-BASED MAGNIFICATION

(75) Inventors: Curtis Christman, Redmond, WA (US); Kaivalya Laxmikant Hanswadkar, Sammamish, WA (US); Shane F. Williams, Seattle, WA (US); Steven J. Ball, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 203 days.

This patent is subject to a terminal disclaimer.

(21) Appl. No.: 11/137,943

(22) Filed: May 26, 2005

(65) Prior Publication Data

US 2006/0268018 A1 Nov. 30, 2006

Related U.S. Application Data

(63) Continuation-in-part of application No. 11/034,136, filed on Jan. 12, 2005.

(51) Int. Cl.
*G09G 5/00* (2006.01)
*G06F 3/00* (2006.01)
*G06F 3/048* (2006.01)

(52) U.S. Cl. ............... 345/660; 345/661; 345/665; 715/733; 715/744; 715/763

(58) Field of Classification Search ............. 345/440, 345/440.2, 660–661, 664, 665; 715/700, 715/708, 733, 736, 744, 763
See application file for complete search history.

(56) References Cited

U.S. PATENT DOCUMENTS

| | | | |
|---|---|---|---|
| 5,231,579 A | 7/1993 | Tsuchiya et al. | |
| 6,268,853 B1 | 7/2001 | Hoskins et al. | |
| 6,301,579 B1 * | 10/2001 | Becker | 345/440 |
| 6,950,989 B2 | 9/2005 | Rosenzweig et al. | |
| 6,983,227 B1 * | 1/2006 | Thalhammer-Reyero | 715/700 |
| 6,996,782 B2 * | 2/2006 | Parker et al. | 715/764 |
| 7,020,848 B2 | 3/2006 | Rosenzweig et al. | |
| 7,062,718 B2 * | 6/2006 | Kodosky et al. | 715/736 |
| 2001/0018693 A1 | 8/2001 | Ramesh et al. | |

(Continued)

OTHER PUBLICATIONS

Catherine Plaisant et al., "LifeLines: Visualizing Personal Histories", ACM 1996, pp. 1-9.*

(Continued)

*Primary Examiner*—Chante Harrison
(74) *Attorney, Agent, or Firm*—Amin, Turocy & Calvin, LLP

(57) ABSTRACT

The subject invention relates to a system and/or methodology that facilitate navigation and monitoring of one or more processes. Within each process, one or more activities or events can be monitored. In particular, navigation through a process can be improved by employing a parameter-based magnification tool. The invention provides for a magnification component that can navigate through aggregations of activities as they relate to one or more processes according to a parameter or metric unit. As a result, a user can view a business process or scheme, for instance, from multiple perspectives at the same time or individually to observe its state or status, trends or patterns, locate problems areas, inefficiencies, or efficiencies within the process, and/or optimize the process or a sub-part thereof.

21 Claims, 18 Drawing Sheets

U.S. PATENT DOCUMENTS

| | | | |
|---|---|---|---|
| 2002/0019833 | A1 | 2/2002 | Takashi |
| 2002/0075330 | A1 | 6/2002 | Rosenzweig et al. |
| 2002/0087622 | A1 | 7/2002 | Anderson |
| 2003/0033296 | A1 | 2/2003 | Rothmuller et al. |
| 2003/0117428 | A1 | 6/2003 | Li et al. |
| 2004/0153445 | A1 | 8/2004 | Horvitz et al. |
| 2004/0205479 | A1 | 10/2004 | Seaman et al. |
| 2005/0076056 | A1 | 4/2005 | Paalasmaa et al. |
| 2005/0091596 | A1 | 4/2005 | Anthony et al. |
| 2005/0105374 | A1 | 5/2005 | Finke-Anlauff et al. |
| 2005/0105396 | A1 | 5/2005 | Schybergson |
| 2005/0187943 | A1 | 8/2005 | Finke-Anlauff et al. |
| 2006/0155757 | A1* | 7/2006 | Williams et al. ......... 707/103 R |
| 2006/0156237 | A1* | 7/2006 | Williams et al. ............ 715/720 |
| 2006/0156245 | A1* | 7/2006 | Williams et al. ............ 715/764 |
| 2006/0156246 | A1* | 7/2006 | Williams et al. ............ 715/764 |

OTHER PUBLICATIONS

Benjamin Bederson, "Ordered and Quantum Treemaps: Making Effective Use of 2D Space to Display Hierarchies", p. 1-25.*

Q. Nguyen & M. Huang, "EncCon: an approach to constructing interactive visualization of large hierarchical data", vol. 4, issue 1, 2005, abstract.*

European Search Report dated Feb. 27, 2007, mailed Mar. 6, 2007 for European Application No. EP 05 11 2625, 3 pages.

European Search Report dated Jun. 9, 2006, mailed Sep. 7, 2006 for European Patent Application Serial No. 05112483. 9 pages.

Gemmell, et al. "MyLifeBits: Fulfilling the Memex Vision," Proceedings ACM Multimedia 2202, 10th International Conference on Multimedia, ACM International Conference, Dec. 1-6, 2002, 4 pages, vol. Conf. 10, Juan-Les-Pins, France, New York, NY.

Plaisant, et al. "Lifelines: Using Visualization to Enhance Navigation and Analysis of Patient Records," American Medical Informatic Association Annual Fall Symposium, Nov. 9, 1998, 6 pages, Orlando, FL.

Schneiderman. "Supporting Creativity with Advanced Information-Abundant User Interfaces," HCIL Technical Report No. 99-16, http://www.cs.umd.edu/trs/99-16/99-16.pdf/, Jul. 1999, 15 pages, College Park, MD.

Strauss, et al. "Knowledge Discovery and Memory Space as Asymmetric Information—the Architecture of the Internet Media Lab netzspannung.org," Proceedings of the Computer Animation 2002, IEEE, Jun. 19, 2002, 10 pages, Piscataway, NJ.

Sudarsky, et al. "Visualizing Electronic Mail," Proceedings of the Sixth International Conference on Information Visualization, IEEE, Jul. 12, 2002, 7 pages.

* cited by examiner

SYSTEMS AND METHODS THAT FACILITATE PROCESS MONITORING, NAVIGATION, AND PARAMETER-BASED MAGNIFICATION

CROSS-REFERENCE TO RELATED APPLICATIONS

This application is a Continuation-in-Part of co-pending U.S. patent application Ser. No. 11/034,316 filed on Jan. 12, 2005 and entitled "TIME LINE BASED USER INTERFACE FOR VISUALIZATION OF DATA," the entirety of which is incorporated herein by reference, U.S. patent application Ser. No. 11/034,432 filed on Jan. 12, 2005 and entitled "ACHITECTURE AND ENGINE FOR TIME LINE BASED VISULAZATION OF DATA," the entirety of which is incorporated herein by reference, U.S. patent application Ser. No. 11/034,402 filed on Jan. 12, 2005 and entitled "FILE MANAGEMENT SYSTEM EMPLOYING TIME LINED BASED REPRESENTATION OF DATA," the entirety of which is incorporated herein by reference and U.S. patent application Ser. No. 11/033,684 filed on Jan. 12, 2005 and entitled "SYSTEMS AND METHODS FOR MANAGING A LIFE JOURNAL," the entirety of which is incorporated herein by reference.

TECHNICAL FIELD

The subject invention relates generally to data management and in particular, to navigating, monitoring, and viewing data at various levels of detail based in part upon a set or subset of parameters.

BACKGROUND OF THE INVENTION

In conventional computing environments, there are limited viewing, searching, browsing, and management techniques available to users and business users, in particular. For example, existing applications have largely adopted a tree structure folder format for organizing and displaying various types of information. Though some relationships between different types of information can be viewed in this manner, such relationships are limited in scope and are primarily dependent upon explicit user input. In addition, many traditional search and filter user interfaces (UIs) tend to be peripheral to a user's focus and fail to provide an adequate scope of the desired information within a manageable computing environment.

Furthermore, viewing or navigating between vast amounts of information at multiple levels can be problematic and nearly impracticable due to screen space constraints. Thus, user interaction among multiple active objects is not feasible under current practices. Overall, conventional information management systems and techniques merely provide disparate views of various parts of the information, thereby requiring more user time and resources to view, process, and/or manage the information as a whole in a cohesive manner.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to a system and/or methodology that facilitate navigation and monitoring of one or more processes. Within each process, one or more activities or events can be monitored as well. Examples of processes can include, but are not limited to, business, industrial, computing, and/or commercial. In particular, navigation through a process can be improved by employing a parameter-based magnification tool. The invention provides for a magnification component that can navigate through content (e.g., aggregations of activities such as business-related activities) according to at least one parameter or metric unit that relates thereto to provide a contextual magnification of such content. As a result, a user can view a business process or scheme (e.g., a systematic plan of action or arrangement of parts), for instance, from multiple perspectives either at the same time or individually to observe its state or status, trends or patterns, locate problems areas or efficiencies within the process, and/ or optimize the process or a sub-part thereof.

According to an aspect of the subject invention, the magnification component can be configured in terms of a selected context scope. The context scope can refer to a parameter which determines a contextual level of magnification. For example, a process may include many different kinds of information based on the parameter types of time, amount, count, value, location, distance, object state, object type, etc.

The context scope can also include a scale which relates to the type of parameter selected. For instance, a time parameter can have a scale of hours, weeks, months, etc. In addition, multiple parameter types can be selected and/or weighted as well. When more than one parameter is selected, the user can opt to cycle through them. For example, imagine that the user has chosen to magnify a portion of a process based on time and count. Thus, when viewing the process under magnification, the information displayed to the user can switch between or cycle through a time scope and then a count scope.

According to another aspect of the invention, the magnification component can essentially query according to additional parameters or items such as activities, instances, events, thresholds, and/or milestones within each process in order to obtain the desired magnification. Thus, in addition to selecting the context scope of magnification, the user can choose to see only certain types of items under such magnification. Magnification components can be saved, re-used, and/or shared with other users via the Internet or intranet. Furthermore, a particular magnification component can be associated or tied to a particular process such that magnification parameters can be applied automatically when the user selects to view the process. This can save the user time when important information is needed quickly.

According to yet another aspect of the invention, each process can be presented and/or organized as a single band or as an aggregation of bands. A single band can include a series of sub-bands to correspond to sub-processes. Thus, the opening of one band can yield a display of several other bands. The bands can be arranged horizontally across a screen or UI along the y-axis and a parameter-based view filter can be positioned on the x-axis. The parameter-based view filter can determine the amount or kind of information that is displayed to the user across all bands (in the visible UI space) or with respect to a highlighted or otherwise selected band(s). For instance, the view filter can reflect a component of time such as hours, days, weeks, months, years, etc. Thus, one or more processes can be examined or monitored within a given time period. Any other parameter that relates to the one or more processes can also be employed in the view filter. For example, a location-based parameter can be used such as city, county, state, region, country, and/or time zone.

Furthermore, the multiple bands (or sub-bands) can be viewed and navigated in a two-dimensional (2-D) or three-dimensional (3-D) manner. When viewed in 3-D, a user can roll through each band, and for each band, view the band and its contents according to a selected view filter. A different view filter can be chosen per band or sub-band. Additionally, items, properties, or attributes that have a weighted value can promote an item towards the foreground in a 3-D view. Rolling such a view can be modal, where one can roll on a dimension (gradual pivot) to bring items of different weight to the foreground. Changing the mode to a different dimension (and having modal role state turned "on" or employing a type of key or mouse control to activate this) can allow switching a different dimension and rolling on the new set.

Alternatively, multiple view filters can be selected per band. In any of the previous scenarios, additional context or changes to the context within each band can be easily visualized. For example, one turn can reveal information about the process according to a time dimension; a second turn can reveal information about the process according to units (e.g., sales units, production units, inventory units, etc.); and a third turn may reveal information about the process according to a region dimension (e.g., southeast US, northeast US, western US, eastern US, etc.). As a result, the user can view many different views or dimensions of any one process.

The bands can be configured with the appropriate process information. Within each process, activities and/or activity groups corresponding to the one or more processes can be defined or included. Color can be employed to indicate a state or status of a process on the whole or some activity or event included therein. For instance, a red band can indicate that the process is near failure or has already experienced a meaningful failure. Yellow or orange can indicate different warning levels and green may signal that the process is satisfactory—given pre-set conditions. Moreover, color or other visual indicators can also be used to provide meaningful information to the user. For example, they can alert the user as to activities, events, or other information that are related to each other or to some other known information (e.g., activity, event, item, etc.). Green may signify a near 100% relationship whereas red may signify a near 0% relationship. Thus, the color of a band can remain static or change depending on the meaning assigned to the color. Band height or color opaqueness can also indicate importance, process status, or activity level.

According to still another aspect of the invention, simulations can be performed to test or optimize processes or some part thereof. In particular, the user can introduce data (e.g., an instance) into a desired location within a process, "test" run the process in simulation, and determine weak areas or points of failure. The user can also predict or pin-point when or where a failure might occur along the process. Alternatively, the user can adjust a process by dragging and dropping a sub-process or activity (e.g., from another process) into a proposed (simulated) process. The proposed process can be run under "normal" operation conditions and the user can ascertain whether such change to the process improves its performance. If so, the change can be readily implemented to optimize the process.

Moreover, a user can view a particular process in real-time or near real-time from an overview perspective, an activity perspective, as well as more in-depth context-based levels such as events, instances, data, or other information related to such activities.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 12 illustrates an exemplary user interface of a configuration window for a magnification tool in accordance with an aspect of the subject invention.

FIG. 13 illustrates an exemplary user interface of a configuration window for one or more bands included in a process monitoring system in accordance with an aspect of the subject invention.

DETAILED DESCRIPTION OF THE INVENTION

Figure 1:
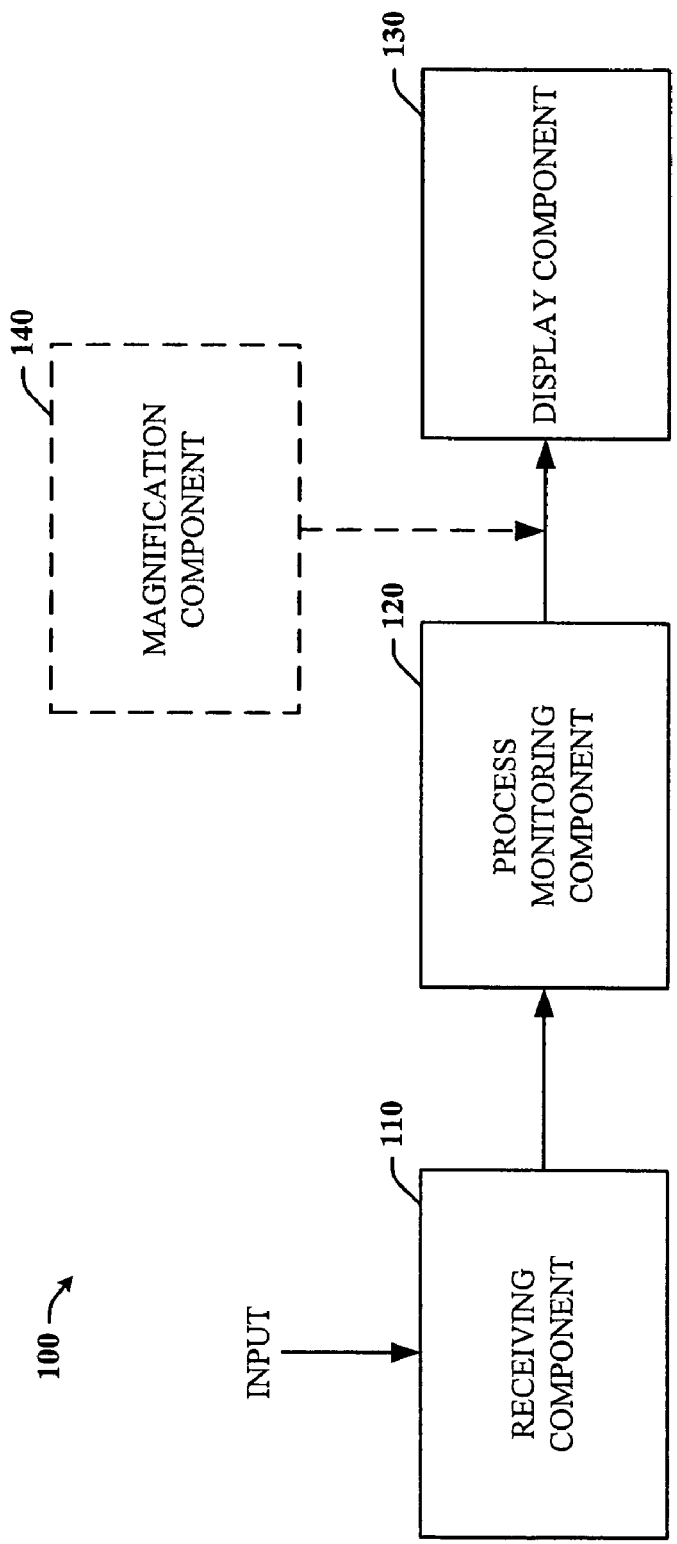
FIG. 1 is a high-level block diagram of a process monitoring system in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with optimizing one or more processes (e.g., related to business, computing, etc.) to mitigate current or future problems or failures and to improve process efficiencies. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is a general block diagram of a process monitoring system 100 that facilitates monitoring of one or more processes in real-time or near real-time in accordance with an aspect of the subject invention. The system 100 includes a receiving component 110 that receives data, whereby the data corresponds to one or more processes or portions thereof. A process can include one or more of at least one of the following: activities, events, instances, documents, objects, and the like. The data can be communicated to a process monitoring component 120 that monitors the data or at least a subset thereof to determine a current state of the data. Following, a display component 130 can display at least one view or perspective of the current state of the data.

In practice, for instance, imagine that the data is received and organized into a plurality of process bands. Each band can relate to a process or a collection of processes. The processes can be monitored to facilitate improving process performance and control of such processes. By monitoring processes via the organization of bands, trends or patterns within such processes can be determined with greater ease. In addition, more meaningful information can be obtained from glancing, viewing, and navigating through the bands.

The system 100 can also include a magnification component 140 that can influence the display of data to a user and can facilitate process monitoring in general. The magnification component 140 can contextually magnify or zoom to one or more parameters of the data (or at least a subset thereof) as selected by the user. Similarly, the magnification component 140 can zoom out of and/or switch between levels of data according to the type of parameters selected or desired at the moment. In addition, the user can filter the magnified or zoomed views based on one or more application or process parameters or user preferences. Thus, the user can further control the type and/or amount of data that he/she is viewing with respect to a particular process. Moreover, the magnification component 140 can essentially perform visual queries. Once the parameters for the query are set, the user can apply the magnification component to the desired process or portion thereof to view more detailed information according to the query parameters.

Figure 2:
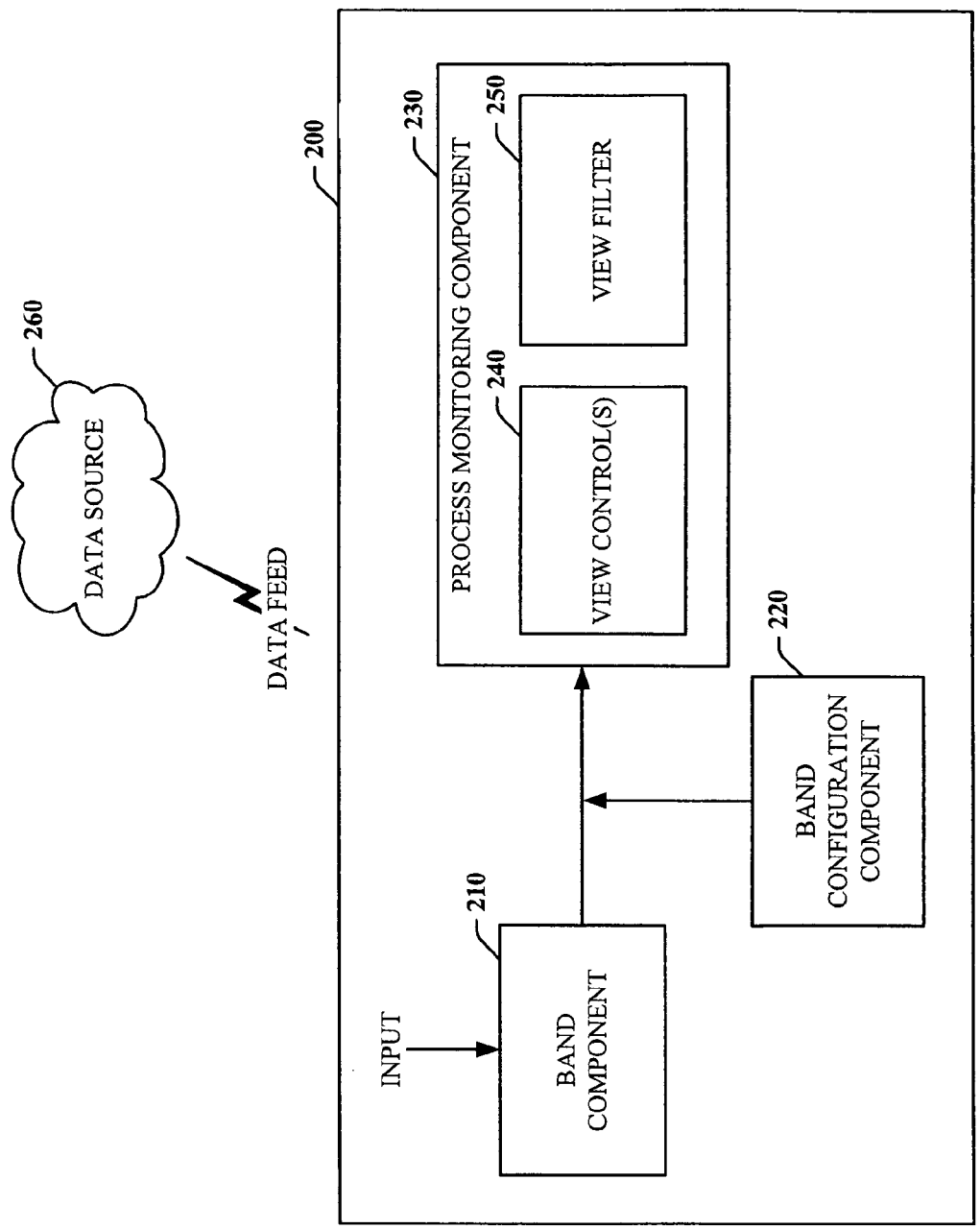
FIG. 2 is a block diagram of a process monitoring system that receives data from the Internet or intranet to facilitate real-time or near real-time process monitoring in accordance with an aspect of the subject invention.

Referring now to FIG. 2, there is illustrated a process monitoring system 200 that facilitates real-time or near real-time process monitoring in accordance with an aspect of the subject invention. The system 200 includes a band component 210 that receives input (data) which corresponds to one or more processes. Each process or an aggregation of interrelated processes can be arranged or configured within at least one band via a band configuration component 220. The configuration component can set the name or title of the band, creation date of the band, owner(s) of the band and include any sub-processes in the main process. Activities associated with the main process and/or the sub-processes can be added and configured in the band as well. Additional sub-processes can also be added to a band where necessary. By configuring each band in this manner, the user can also filter his/her view of the process or any portion thereof so that only such desired portions of the process are displayed.

In particular, a process monitoring component 230, which can monitor an on-going process, includes one or more view controls 240 and a view filter 250. The view controls 240 can refer to one or more command buttons located on the display or UI that allow the user to navigate through the displayed content such as by changing the view (e.g., toggling between different views of the process), expanding or closing the bands at various levels of detail (e.g., activity level, event level, instance level, and the like), re-locating one or more bands, etc. in the course of monitoring such processes. For example, a double-clicking action can be performed to drill down into or expose various band properties. The view filter 250 can further emphasize or enhance the amount and type of information displayed. Overall, the view controls 240 and/or view filter 250 allow the user to visualize a business process, for example, from different perspectives. Furthermore, relationships between activities, instances, and/or objects and their current states within a given process can be readily observed and evaluated.

The process monitoring system 200 can receive its data from an Internet or intranet-based network 260 in order to provide the user with real-time or near real-time status information regarding each process being monitored. Conversely, the user can also bring or call up historical data to compare current process settings with previous settings in an effort to optimize the performance and mitigate failures, bottlenecks, or other problems. Vulnerabilities within the process can also be flushed out.

Figure 3:
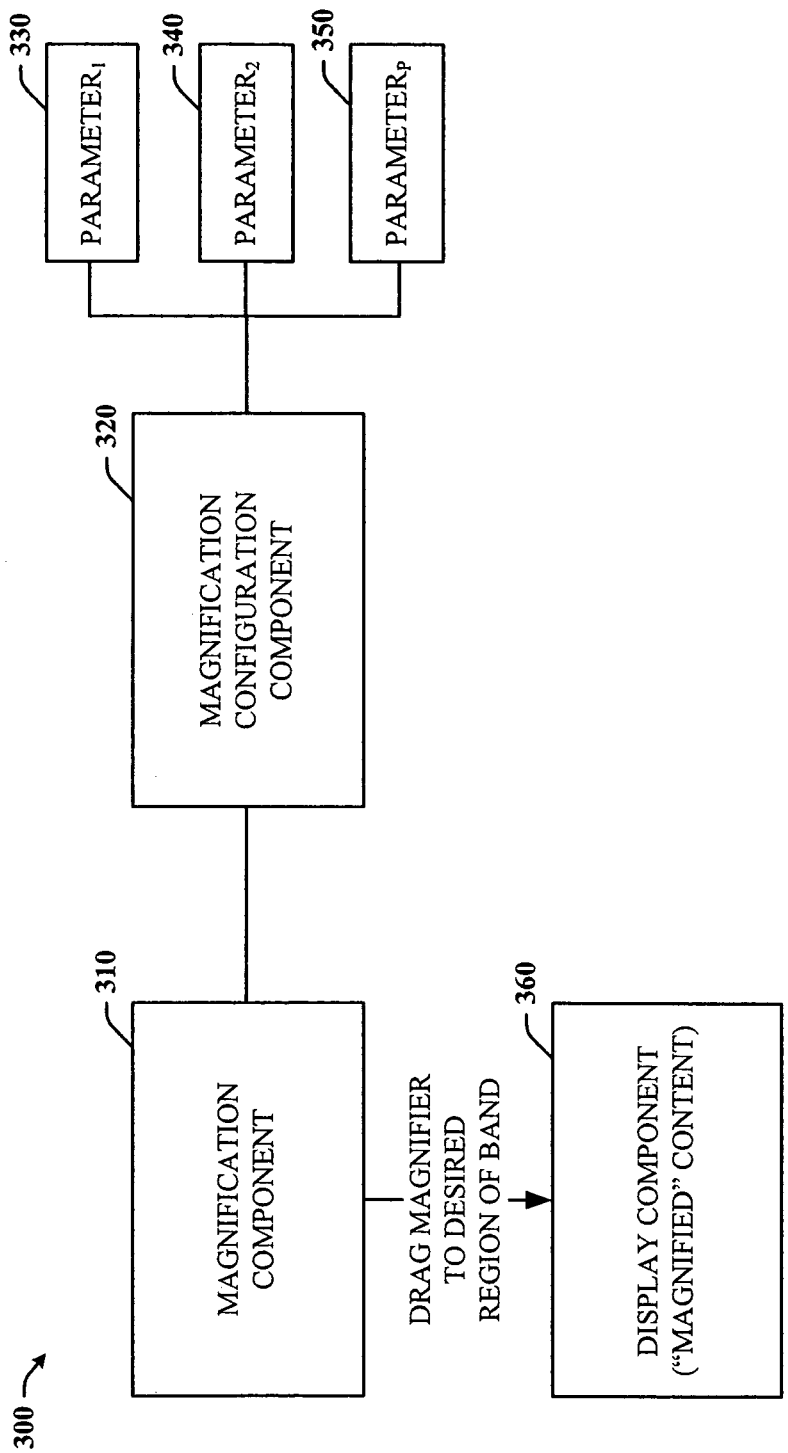
FIG. 3 is a block diagram of a magnification tool or system that facilitates navigating through information based on one or more selected parameters in accordance with an aspect of the subject invention.

Referring now to FIG. 3, there is illustrated a context magnification tool or system 300 that can facilitate navigation through various types of information based on parameterized or contextual zooming. The system 300 includes at least one magnification component 310 that can be configured by a magnification configuration component 320. The magnification component 310 contextually magnifies selected data (or a selected location within a process) based on at least one parameter. Parameters may be made up of aggregations of attributes or properties depending on how rich such information needs to be. Such parameters can be chosen or defined in the configuration component 320. For example, suppose that PARAMETER$_1$, 330, PARAMETER$_2$ 340, and PARAMETER$_P$ 350 (where P is an integer greater than or equal to one) are available parameters. The user can select any one or all of the available parameters. In addition, new parameters can be added and made available as well. When the magnification component 310 has been configured as desired by the user, the user can drag the resulting magnifier (or magnifier glass) to a desired region of at least one band. By doing so, the user can see an in-depth view of the corresponding portion of the process (e.g., "magnified" content) according to the magnifier's parameters—via a display component 360). The magnified content or magnified views can also be filtered to further delineate the type of information displayed to the user.

Several different magnifiers can be configured, saved, and reused again and again. Configuration of the magnifiers can also include color coding to show associations or relationships between a particular band(s) and one or more magnifiers. To save even more time for the user, a magnifier can be permanently associated or linked to a particular band. Thus, when the user wishes to expand the view of the band using magnification, such magnification can be performed automatically.

Figure 4:
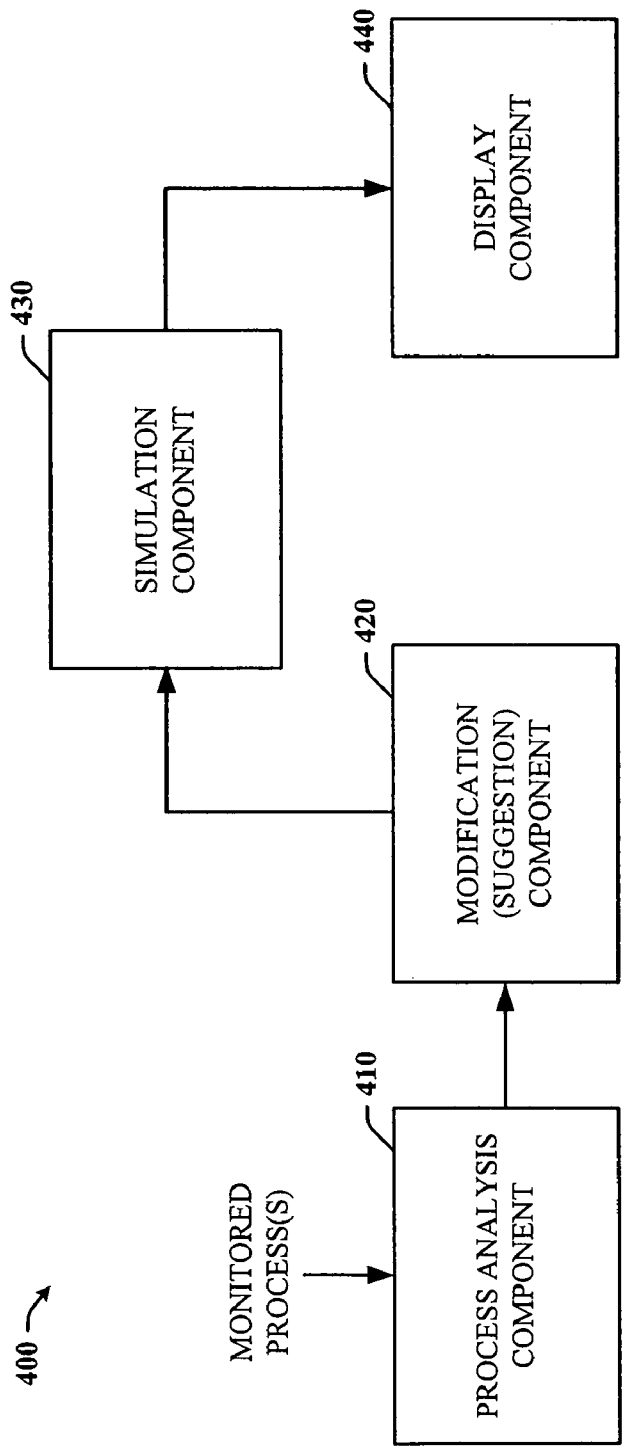
FIG. 4 is a block diagram of a process monitoring system that facilitates process simulation in accordance with an aspect of the subject invention.

Turning now to FIG. 4, there is illustrated a block diagram of a process monitoring system 400 that facilitates process simulation in accordance with an aspect of the subject invention. The system 400 includes a process analysis component 410 that can examine and evaluate one or more monitored processes according to an overall process performance and/or according to incremental performances at various stages, activities, or events throughout a process. In addition, the analysis component 410 can score or rate a process and/or highlight potential sources/origins of inefficiencies. This information can be communicated to a modification/suggestion component 420 that can propose modifications to correct one or more detected inefficiencies.

Following, a simulation component 430 can be invoked to simulate the process with the recommended changes. The process map view of the simulation can be displayed to the user by a display component 440 along with the results. By viewing the process map of the process during the simulation, the user can visualize where or how problem areas are affected by such changes and/or look for new problem areas. The current version of the person can be presented on the display along with the simulated process to compare the current process with one or more simulated processes.

In practice, for example, imagine that a process designer or business analyst uses the same UI to understand the "what-if scenarios". He can simulate happy path scenarios as well as understand where the process will choke, bottleneck, etc. The process bands can change their colors based on whether they will have problems down the road. Thus, the bands are not only undergoing simulation, they can also show the impact change. If particular parameters on the process are changed and the process does not favor such changes, then it may appear red from the point where the changes occur.

For instance, if a purchase order of 10,000 items arrives instead of 5,000 at 11:00 AM, the process in its current design is most likely to choke at some point in the process and fail to deliver those orders at the required time and date. In such a case, the business analyst can drop (e.g., drag and drop) a suitable context magnifier (magnification component) on the process band that has turned red to check the process design. Following, he can optimize the process to cater to such situations; and under simulation and/or in reality, he can see the color of the band transition from red to green meaning that the process is now operating satisfactorily.

In general, color or other visual indicators can be employed to provide meaningful information about a process at a glance. An exemplary use of color can be as follows:

Blue—process is inactive for some length of time (can be set by the user);

Green—process is active and nothing can be seen as a problem based on the current circumstances and process instance data;

Yellow—process is active and there could be some hiccups: orders may be delayed but the process will eventually deliver the orders Red—process is active and there is some serious problem with the process design. The process in its current design state will not be able to cater to one or more of the process instances.

Figure 5:
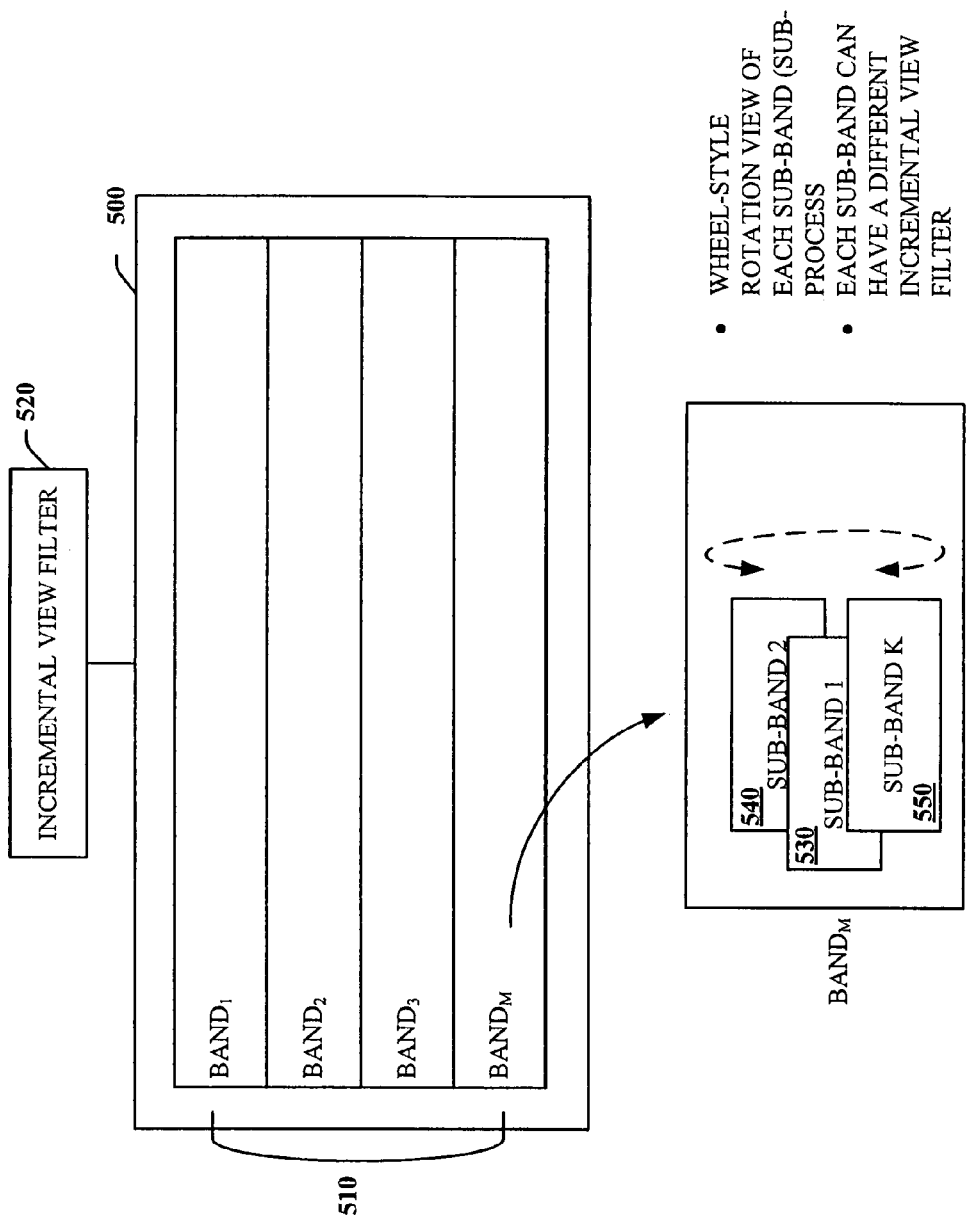
FIG. 5 is a block diagram that demonstrates a band layout and navigation thereof within a process monitoring system in accordance with an aspect of the subject invention.

FIGS. 5-11 which follow below demonstrate various navigation and viewing aspects in connection with context magnification and process monitoring as described hereinabove. In FIG. 5, for example, an exemplary band layout 500 is illustrated. The bands 510 can be aligned along the y-axis and an incremental view filter 520 can reside along the x-axis of the display. The bands can be arranged for viewing and navigation in a two dimensional manner using arrow features, scroll bars, and the like. However, they can also be organized in a three-dimensional fashion to resemble a wheel-like structure. The incremental view filter 520 can be configured to coincide with each particular band and thus change according to the band in view (or on top).

Furthermore, each band can include a collection or aggregation of sub-bands. For example, BAND$_M$ can comprise SUB-BAND$_1$ 530, SUB-BAND$_2$ 540, and SUB-BAND$_K$ 550 (where K is an integer greater than or equal to one). These bands can be arranged and viewed in 3-D as well. Again, each sub-band can have its own incremental view filter configured to correspond to the contents of the sub-band and in particular, how the user desires to view such content.

Figure 6:
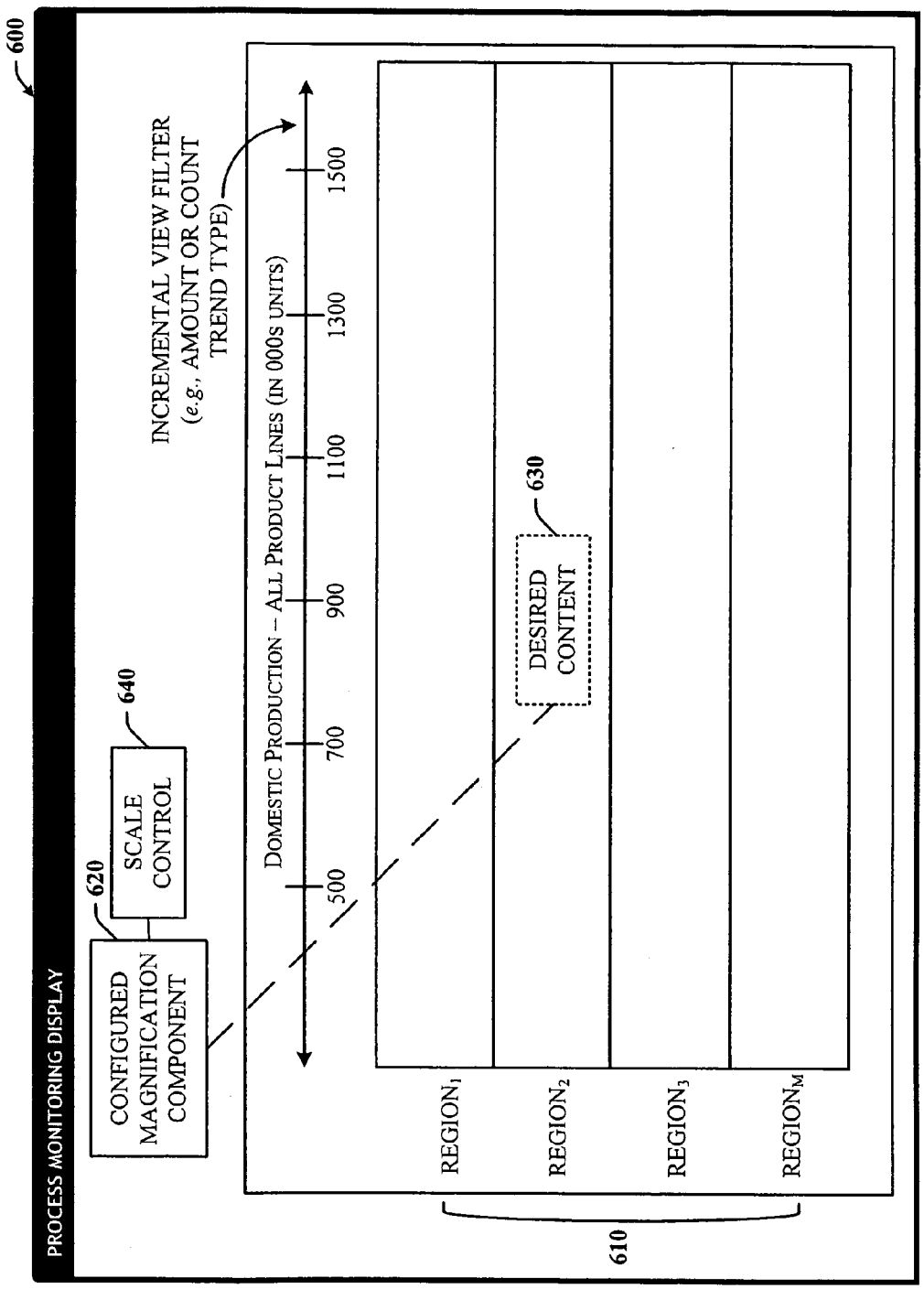
FIG. 6 is a block diagram that demonstrates a schematic illustration of a magnification tool employed in a process monitoring system in accordance with an aspect of the subject invention.

Turning now to FIG. 6, there is illustrated a block diagram that demonstrates an exemplary display 600 of a process monitoring system, and in particular, the magnification aspect that can be employed in such a system. The display 600 shows a plurality of bands 610 labeled as different REGIONS (e.g., sales regions, warehouse regions, production regions, etc.), whereby each band refers to a process such as order fulfillment by region, network activity/traffic by region, etc, for example. To view some part of at least one process in greater detail but within a desired context, the user can configure a magnification component 620 according to the desired context and then drag and drop (indicated by dashed line) the magnification component 620 onto a preferred area of the band. Where the magnification component 620 is placed on the band identifies the desired content 630 that will be magnified.

A scale control 640 can also be employed to determine the amount of information displayed as a result of the magnification. For example, if the desired content is magnified according to a time parameter and the selected scale is minutes, then the scale control can be increased or decreased to set the number of minutes to view (e.g., 1 minute, 2 minutes, etc.). Therefore, as the scale is increased, the dashed box (630) increases in size accordingly. Another way to think of scaling is that as the minutes increase, the scale in the dashed box (630) condenses accordingly.

Though not shown in the figure, each band can also be viewed based on a scale dimension as well. For example, a band, or rather the process depicted therein, may span 75 minutes in total length. The user could then select to view the band on a 15-minute scale. An incremental view filter also can determine the context of the band information displayed to the user. According to the example in FIG. 6, the view filter relates to an amount or count trend with respect to "Domestic Production of All Product Lines".

Figure 7:
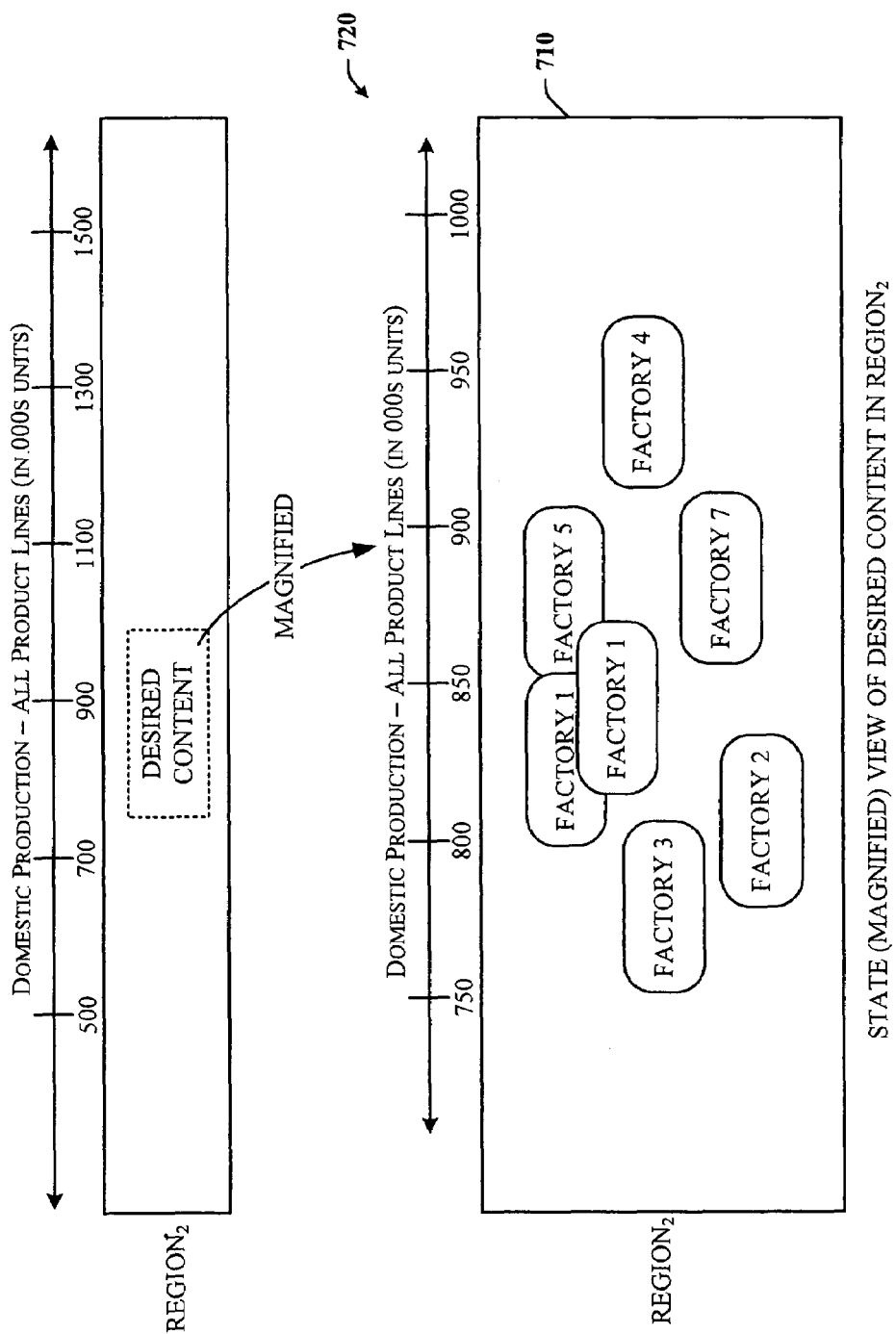
FIG. 7 is a block diagram continuing from FIG. 6 that demonstrates a magnified view of information in accordance of with an aspect of the subject invention.

Continuing from the display 600 in FIG. 6, FIG. 7 demonstrates the change in view in Region$_2$ 710 after invoking the magnification component. As can be seen, the magnified portion within Region$_2$ has now expanded to expose a state view 720 of a plurality of activities (e.g., factories) located in Region$_2$ that exhibit production units in the selected range. The state of each factory can be represented by a color, for instance, or some other visual indicator.

Other magnification components can be employed at this level within the band as well to see even more information regarding events or instances between factories or occurring within any one factory. Alternatively, the user can select (click) on any activity, event, or instance to view more information regarding such activity, event, or instance. In this scenario, the factories can correlate to activities, instances, or events, depending on the band and/or process configuration. Moreover, the user can drill down into several layers of information according to the context of information desired.

The magnification component can also be applied to more than one band at a time. In this way, the user can view more than one process according to the same selected parameters. This can be useful when comparing processes, for instance, or for focusing in on a subset of the processes being monitored.

Figure 8:
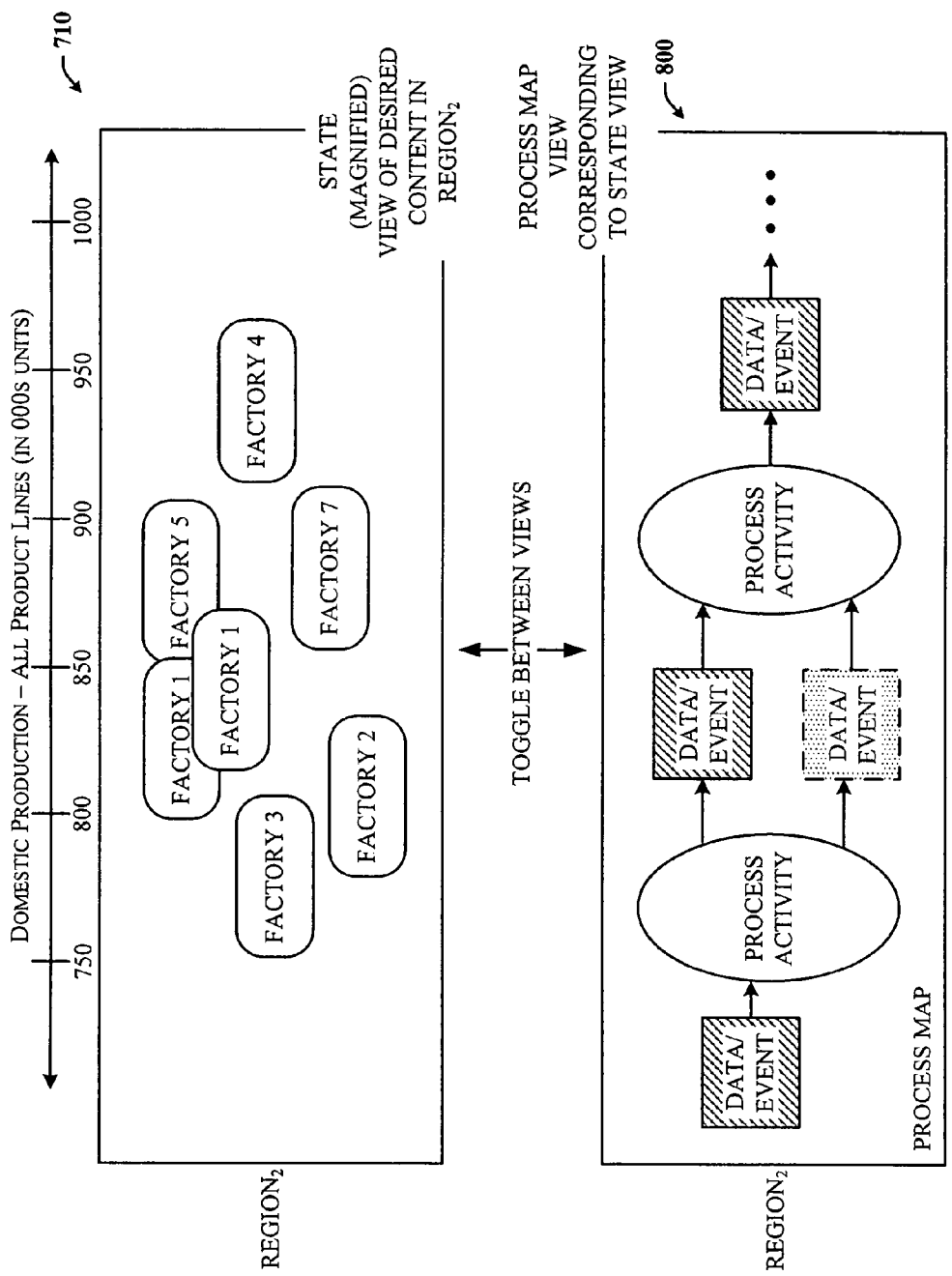
FIG. 8 is a block diagram continuing from FIG. 7 that demonstrates toggling between a state-view and a process map view of the information in accordance with an aspect of the subject invention.

The views in FIG. 8 continue from FIG. 7. The user can toggle from the state view 710 (FIG. 7) to a process map view 800 to visualize the underlying process that is being carried out. The process can involve activities, events, instances (e.g., documents, orders, etc.), and/or any other data. When in the process map view, the whole process or only the part that corresponds to the content shown in the related state view can be presented. Again, the state of each part of the process can be indicated by color or some other visual indicator. Hence, the user can quickly determine the status of the process as a whole or of some portion thereof.

Figure 9:
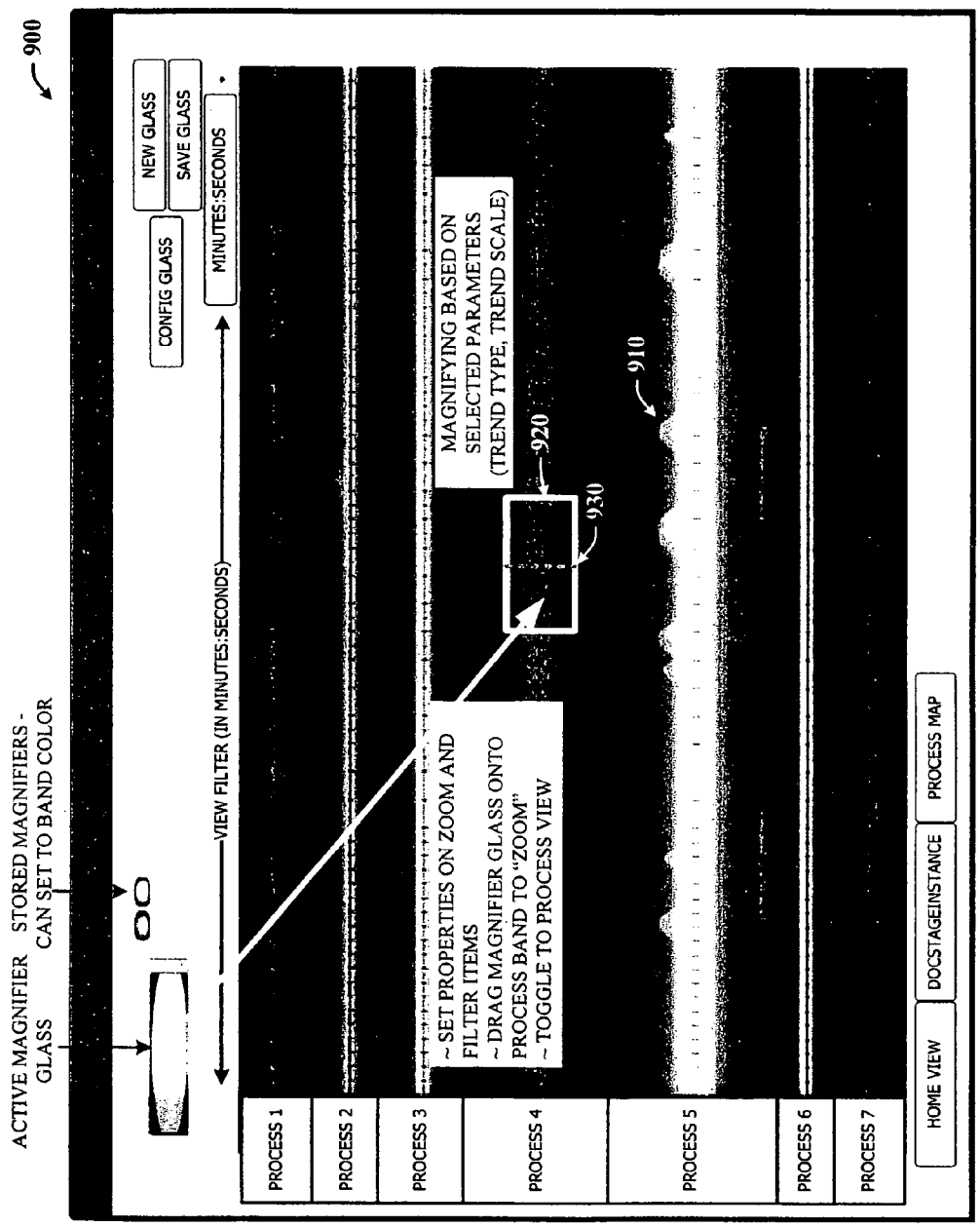
FIG. 9 illustrates an exemplary user interface of a process monitoring system in accordance with an aspect of the subject invention.
Figure 10:
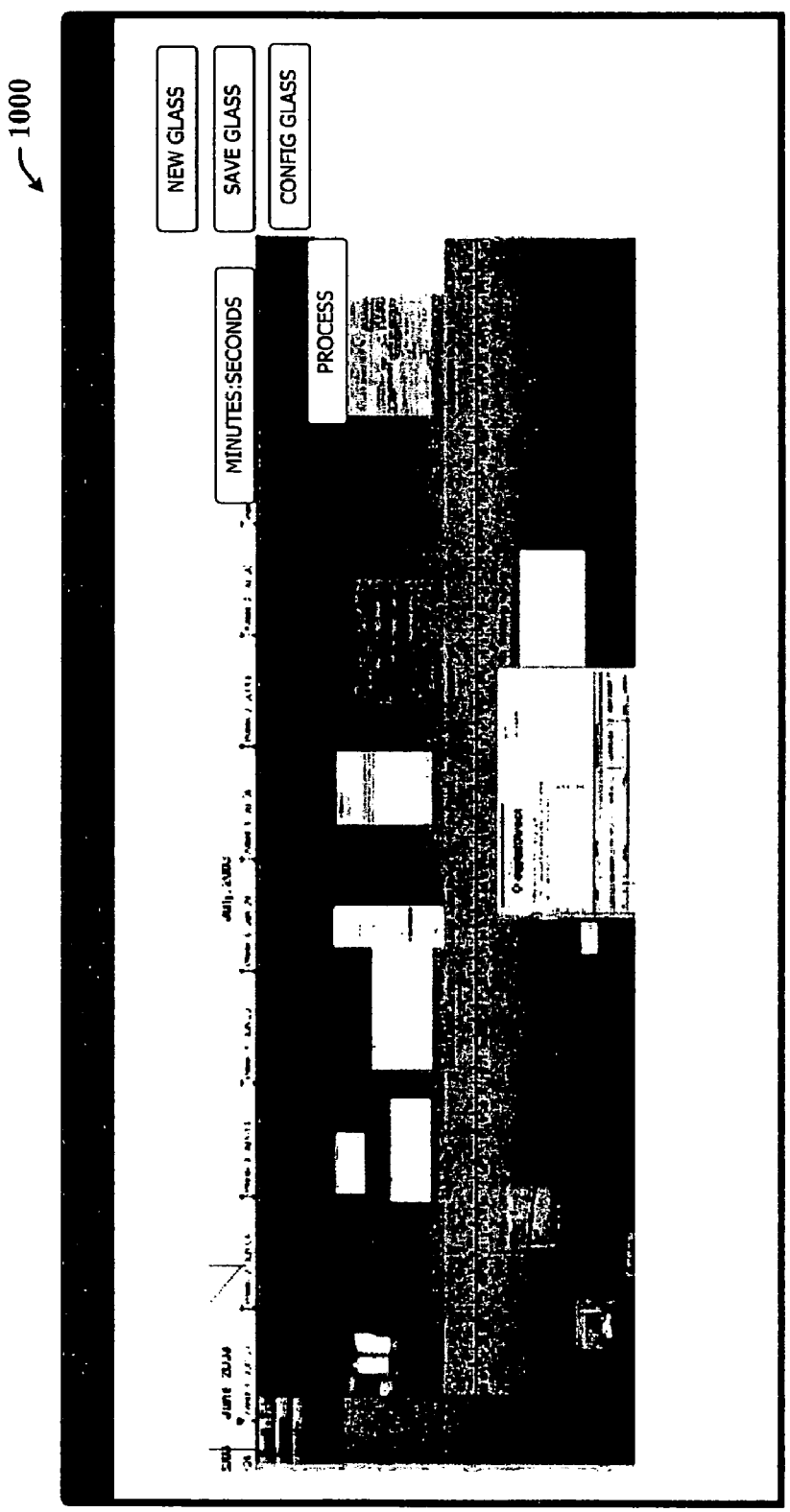
FIG. 10 illustrates an exemplary user interface of a state view within a process monitoring system in accordance with an aspect of the subject invention.
Figure 11:
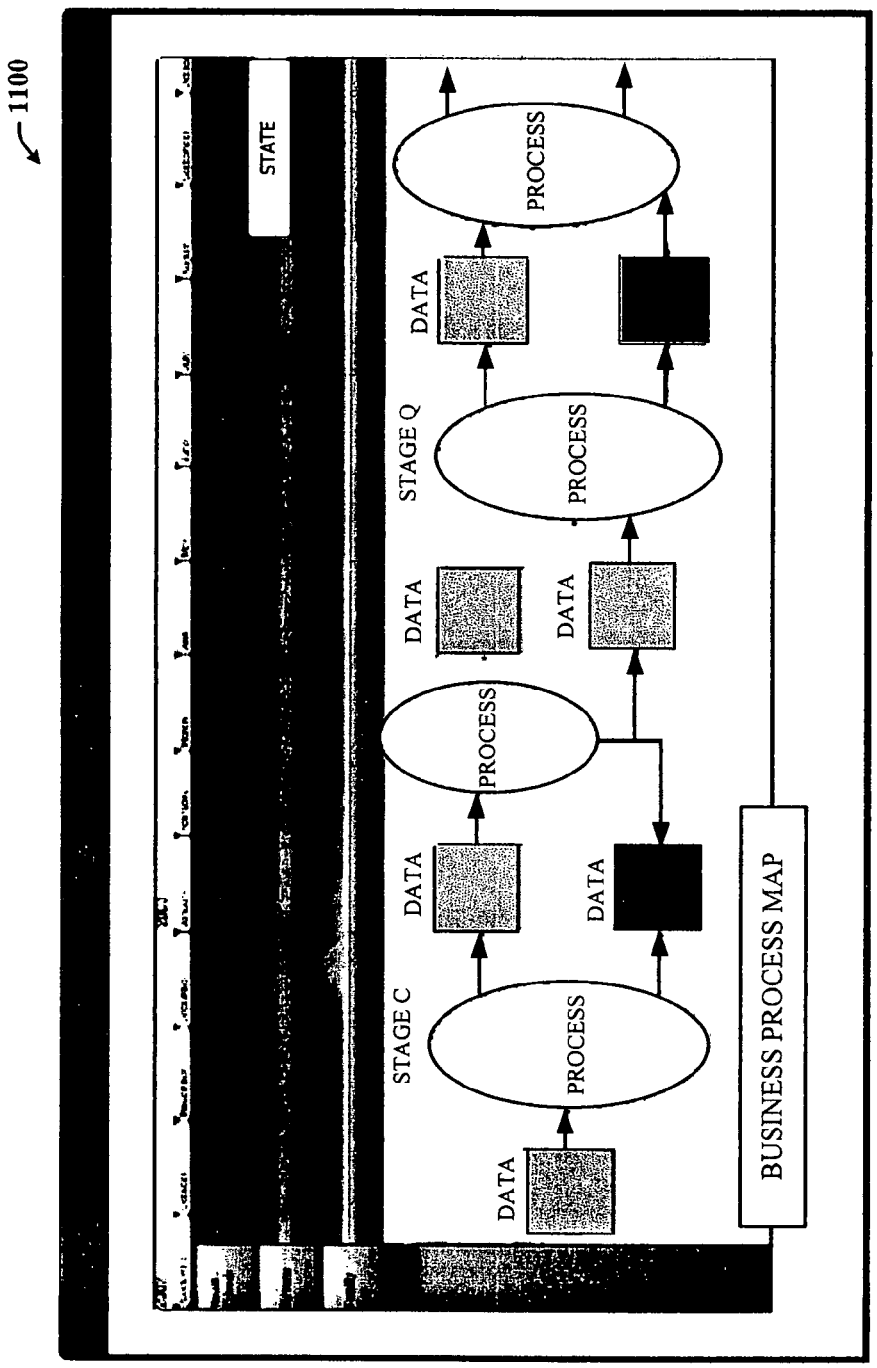
FIG. 11 illustrates an exemplary user interface of a process map view within a process monitoring system in accordance with an aspect of the subject invention.

FIGS. 9-11 demonstrate exemplary UI in connection with magnification and/or process monitoring in accordance with various aspects of the subject invention. The UI 900 in FIG. 9 can represent a user's home view of the plurality of processes that are being monitored or for which monitoring is desired. In this case, all the process bands are "closed" however their color and/or height can indicate the respective processes' states. In addition, spikes or sinusoidal curves (910) can designate configured and/or weighted values or quantities, activity levels, density of events or instances, and the like.

Also visible to the user is an active magnifier glass (magnification component) which has been configured and/or saved for re-use. Stored magnifiers may also be visible to the user for easy access or retrieval. To perform a context zoom of a portion of at least one band, the user can drag the active magnifier glass to the desired location on the band (920). To pinpoint the exact location on the band, the user can make use of a reference line 930. After releasing or dropping the magnifier glass onto the band, the UI 1000 in FIG. 10 can result. The band now appears to be "open" and a state view of a number of activities, events, instances, objects, or other data is exposed based on the parameters of the magnifier glass. The position of each item visible in the band can be determined at least in part upon its weight as an indication of its relative importance or relevance. For example, some items may appear in the foreground and larger in scale than other items—as demonstrated in the figure.

To switch to a corresponding process map view, the user can click on a "process" command button—at which time, the UI 1100 in FIG. 11 can appear. The UI 1100 shows a business process map that corresponds at least in part to the state view 1000 in FIG. 10. Though not shown, it should be appreciated that the process map view can also be represented in a linear and/or atmospheric perspective view to show weighted relevance of objects or phases throughout the process. To toggle back to the state view 1000, the user can click the "state" command button. The UI in FIGS. 10 and 11 can also include other navigation controls which are not explicitly shown.

Figure 12:
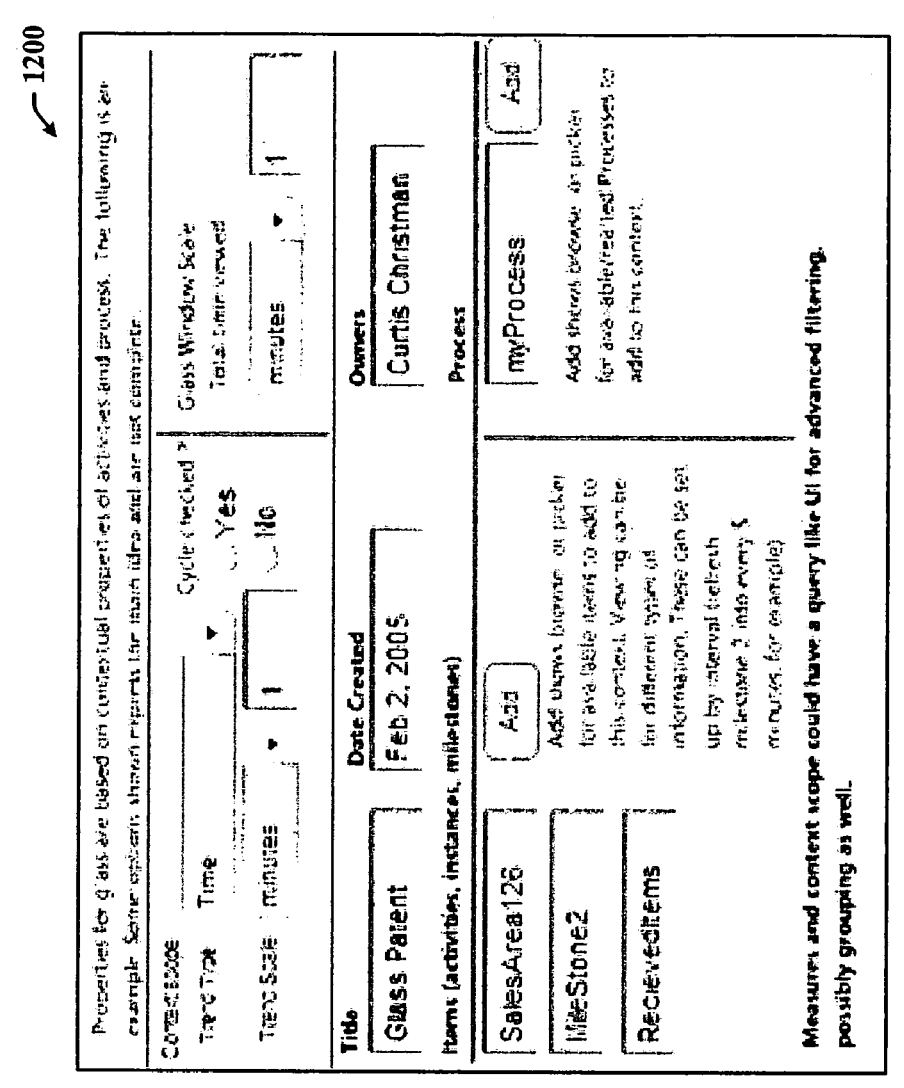
Figure 13:
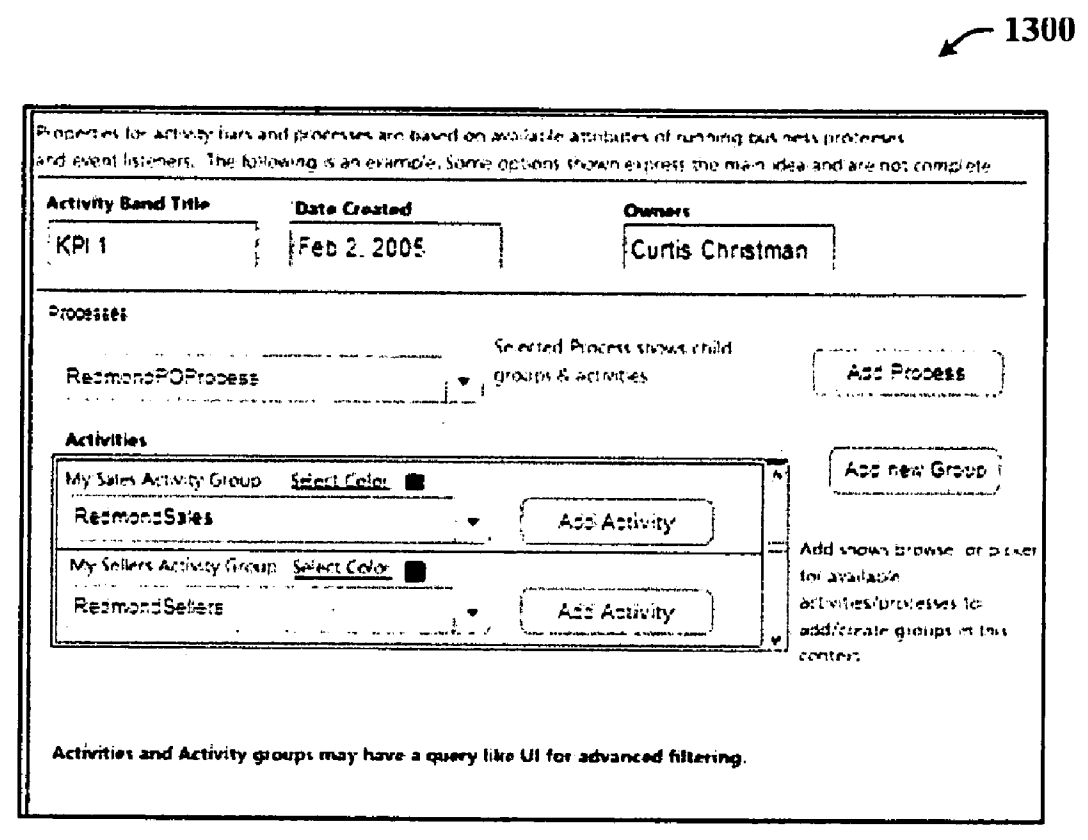

Referring now to FIGS. 12 and 13, there are depicted exemplary configuration screens 1200, 1300 that a user may employ to customize each magnification component and each band, respectively. Each screen illustrates the various elements of each magnification component or band that a user can configure according to his/her preferences. For example, in FIG. 12, the context scope and scale of the magnifier can be selected. In addition, the user can magnify the content in part by filtering or querying for only certain types of information. That is, the user can also select what types of items he/she wishes to see within the chosen context scope and scale. Hence, the magnification component can perform visual queries.

Bands can be configured in a similar manner. The processes or sub-processes which are to be included in any one band can be selected from a list of available processes, for example. Activities within each process or sub-process can be chosen as well. Each band can then be expanded to reveal such multiple levels of information. Filtering techniques using various navigation tools or the magnification component can also be employed to pare down the amount or type of information presented to the user.

Various methodologies in accordance with the subject invention will now be described via a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Figure 14:
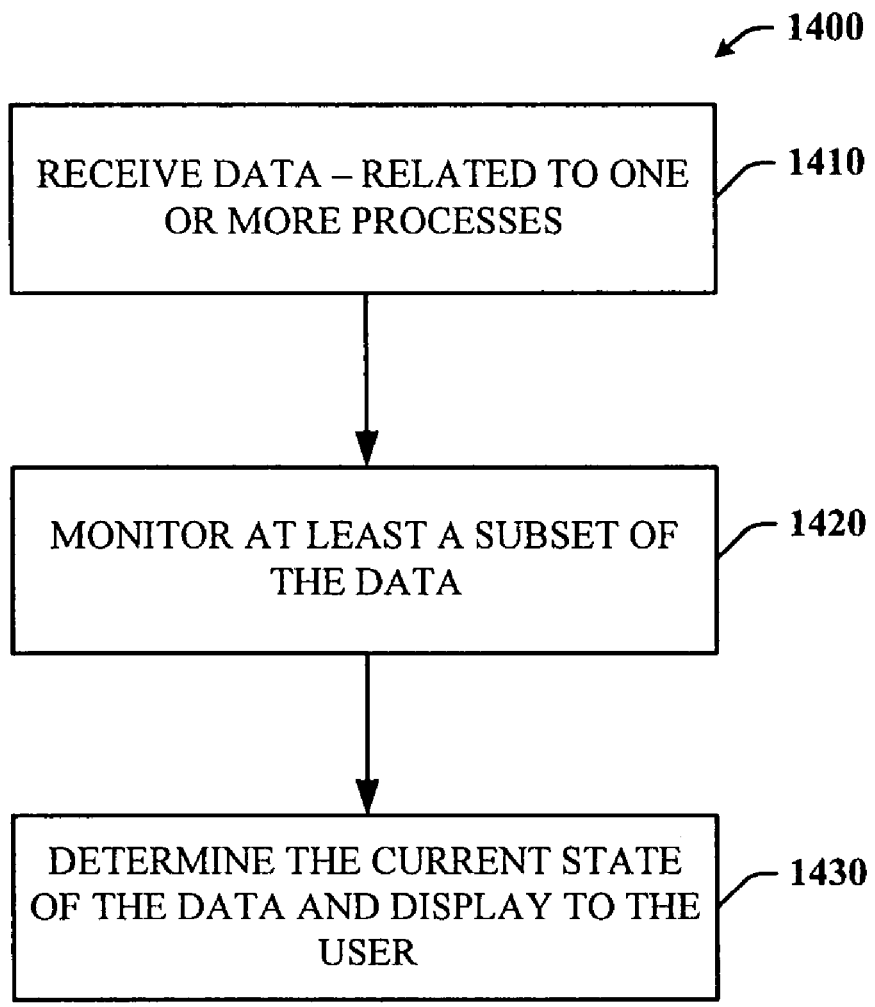
FIG. 14 is a flow diagram illustrating an exemplary method that facilitates monitoring and navigating through one or more processes in real-time or near real-time in accordance with an aspect of the subject invention.

Referring now to FIG. 14, there is a flow diagram of an exemplary method 1400 that facilitates monitoring and navigating through one or more processes in real-time or near real-time in accordance with an aspect of the subject invention. The method 1400 involves receiving data which is related to one or more process at 1410. At 1420, at least a subset of the data can be monitored in real-time or near real-time. At 1430, a current state of at least the subset of data can be determined. In practice, for instance, imagine that the process data is organized into a plurality of bands wherein each band denotes at least one process. Within each process, a plurality of activities, events, instances, and/or other data can be present to carry out such process. Thus at least one process can be monitored in order to determine the state of the process as well as the state of the various activities, events, and/or instances included therein.

The state of a process can be presented to the user through the use of color or some other visual indicator. By determining the state of the process or the states of portions of the process in real-time or near real-time, the user can readily forecast potential problems that may occur at some later time should process conditions or variables change. Any current problems can also be addressed as they are detected to mitigate the rise of additional issues derived from the current ones.

Figure 15:
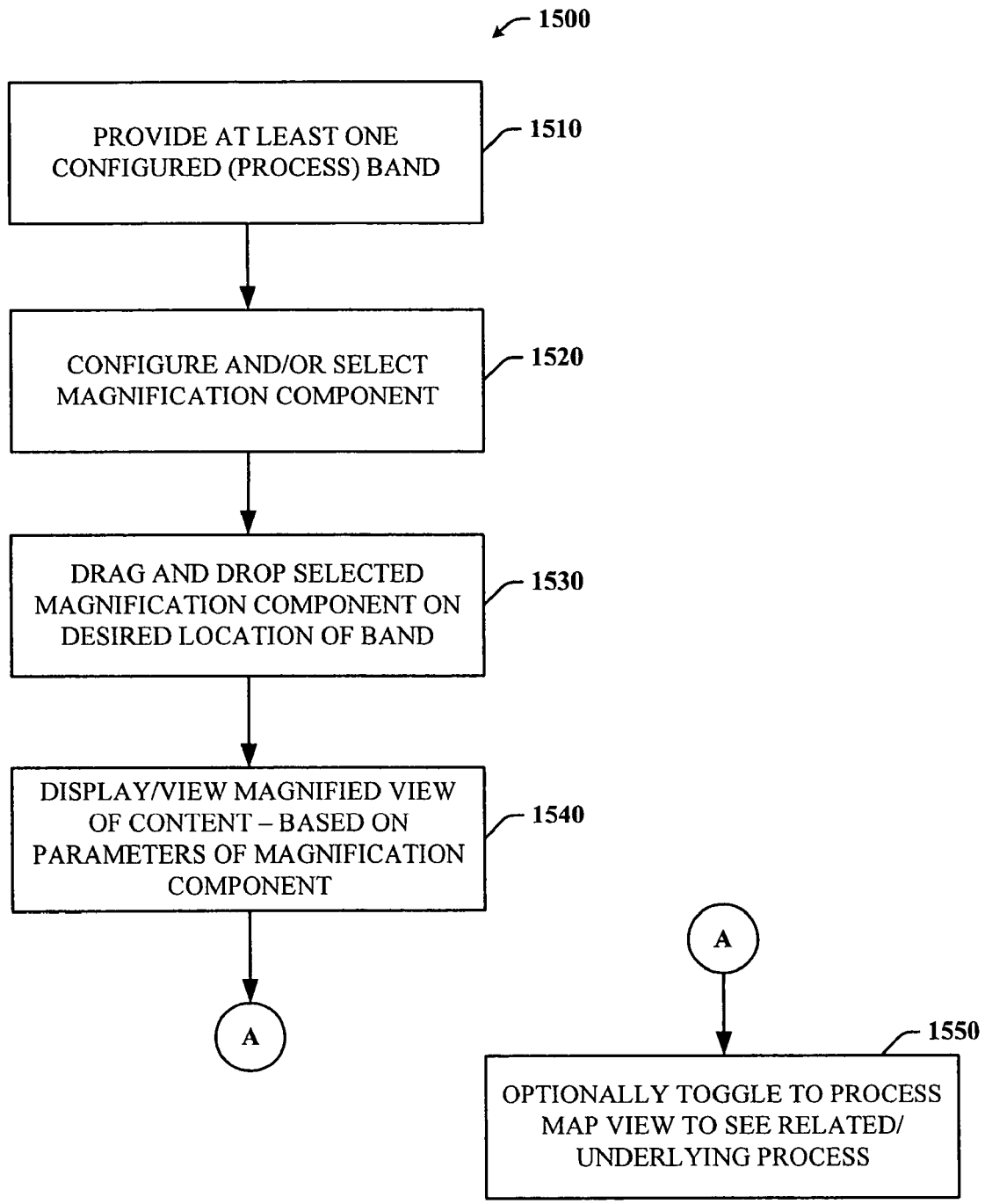
FIG. 15 is a flow diagram illustrating an exemplary method that facilitates magnifying at least a subset of data within a process (band) based on one or more selected parameters in accordance with an aspect of the subject invention.

In the case of a production process which has been deployed and is in operation, a company analyst can monitor and analyze the health of the production process. When monitoring the process, the analyst can observe various spikes of activities. To see the actual "interior" of the process, the analyst can employ (or drop) a suitable magnifier on at least one band corresponding to the production process to gain further insight. FIG. 15 addresses this magnification technique in greater detail.

In FIG. 15, there is a flow diagram of an exemplary method 1500 that facilitates magnifying at least a subset of data within a process (band) based on one or more selected parameters in accordance with an aspect of the subject invention. The method 1500 involves providing at least one configured process band at 1510. At 1520, a magnification component can be configured with a set of parameters and/or selected for use (if already configured). The selected magnification component can be dropped or moved to the desired location of the band at 1530.

Referring again to the previous example, if the analyst notices an unusual spike in activities when approximately 5,000 units are produced, then the magnification component can be dropped on the area corresponding to this count to see more information about the process at this count—including the state of the information in this area. The magnification component can limit the scope of information magnified for the user based on the chosen parameters.

At 1540, the magnified view of the desired content based on such parameters set in the magnification component can be displayed or presented to the user. Optionally, at 1550, the user can toggle to a process map view to see the underlying processes or activities taking place. Here, the user can see the inner workings or operations of the production process or a portion thereof to better understand the state of that part of the process. For instance, if the state indicated a bottleneck, looking at the process map view can assist the analyst in ascertaining the reasons for the bottleneck.

Figure 16:
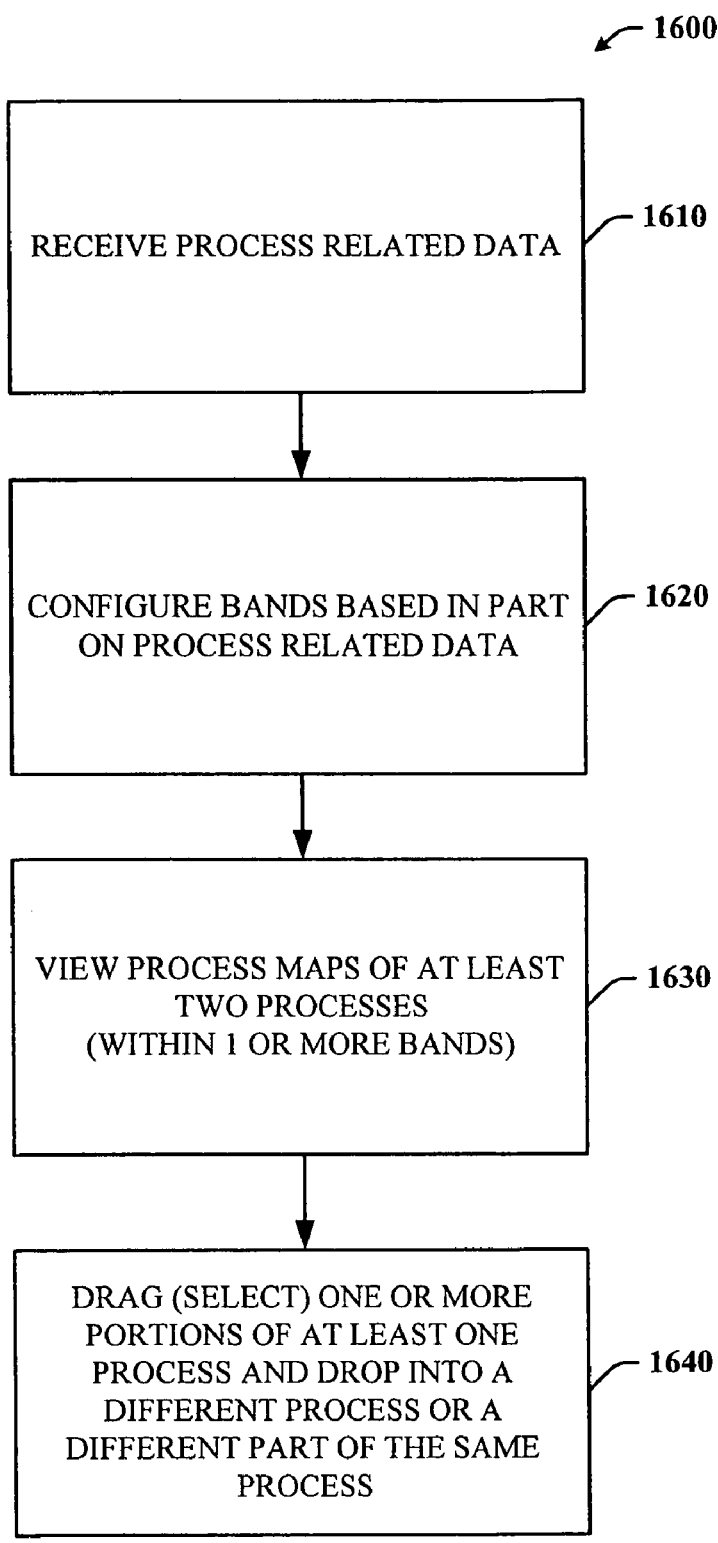
FIG. 16 is a flow diagram illustrating an exemplary method that facilitates navigating between processes across more than one band or sub-band in accordance with an aspect of the subject invention.

Referring now to FIG. 16, there is a flow diagram of an exemplary method 1600 that facilitates navigating between processes across more than one band or sub-band in accordance with an aspect of the subject invention. The method 1600 involves receiving process-related data at 1610 and then configuring one or more bands based in part on such process related data at 1620. At 1630, at least two process maps can be viewed at the same time, for example. At 1640, various parts of either process can be moved or copied into any other process or to a different part of the same process. Before activating such changes to any one process, the "new" process can undergo a simulation to determine the impact of such changes—as further described in FIG. 17.

Figure 17:
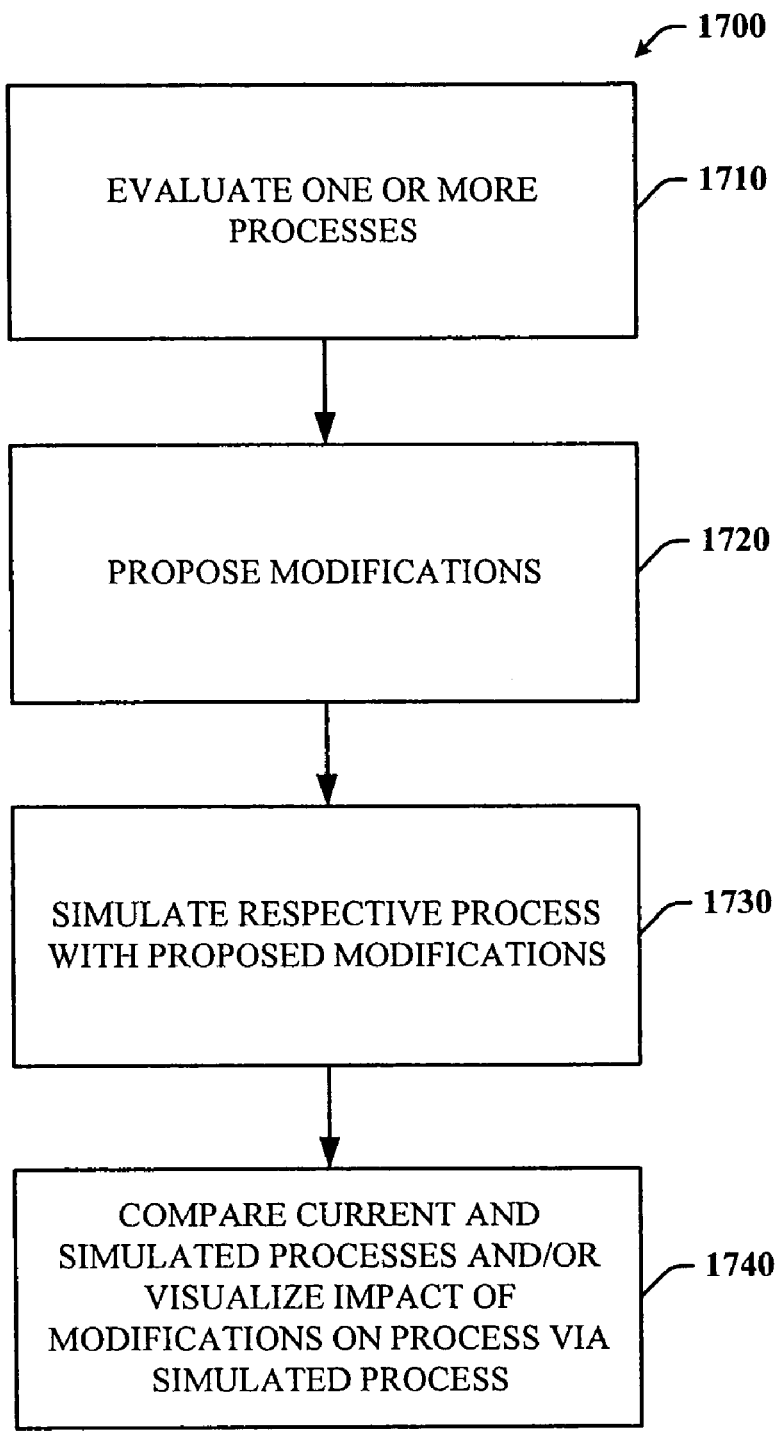
FIG. 17 is a flow diagram illustrating an exemplary method that facilitates simulating a process for testing or process optimization in accordance with an aspect of the subject invention.

FIG. 17 illustrates a flow diagram of an exemplary method 1700 that facilitates simulating a process for testing or process optimization in accordance with an aspect of the subject invention. The method 1700 involves evaluating one or more processes at 1710. Based on such evaluations, modifications to such process or processes can be proposed at 1720. At 1730, the modified processes can be activated and placed into operation under simulation conditions. At 1740, the current process can be compared to its simulated counterpart in order to determine the impact of such modifications on the process. Simulation as described herein can save resources and reduce costs. In addition, potential problems with "new" processes can be predicted and trouble areas can be detected.

Figure 18:
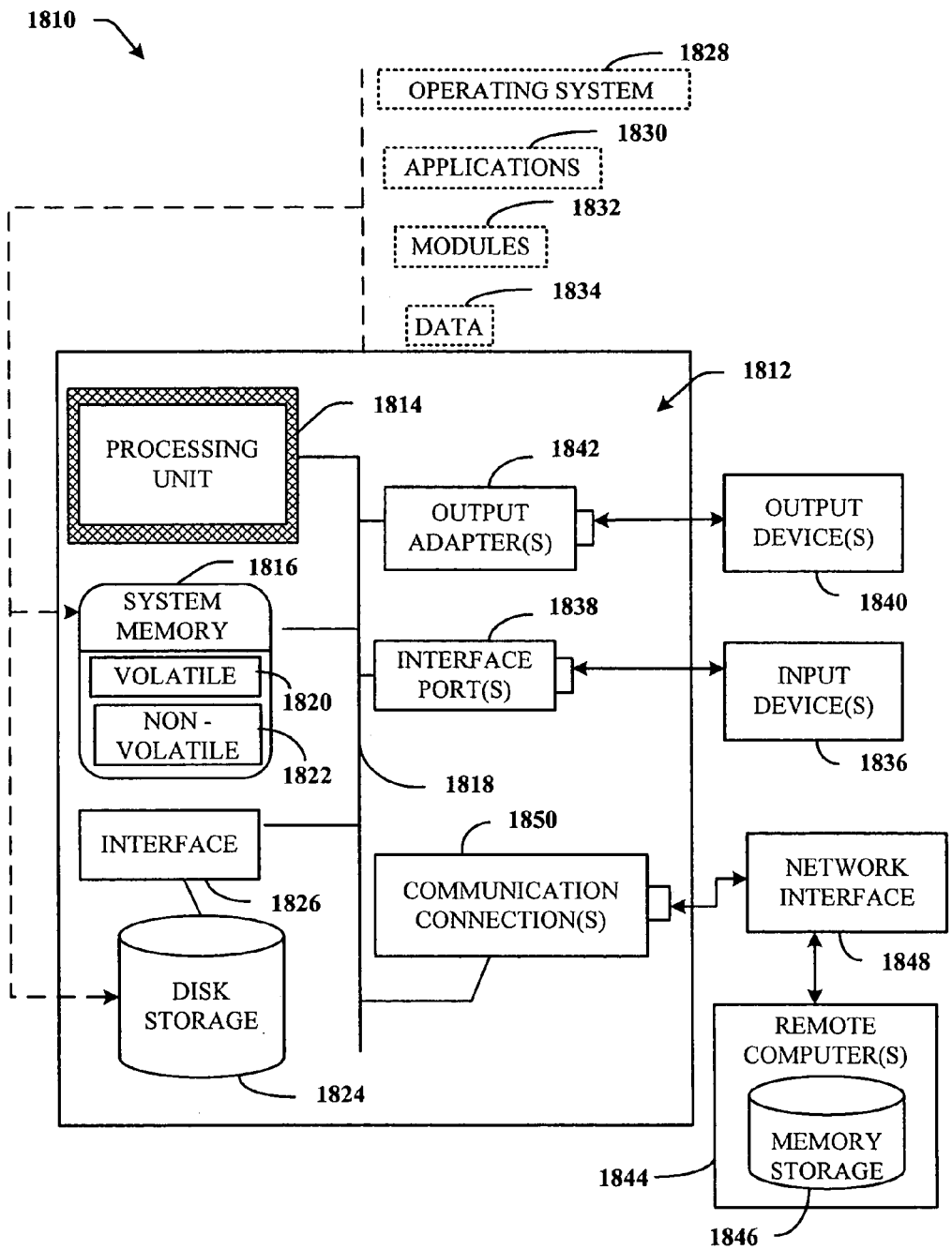
FIG. 18 illustrates an exemplary environment for implementing various aspects of the invention.

In order to provide additional context for various aspects of the subject invention, FIG. 18 and the following discussion are intended to provide a brief, general description of a suitable operating environment 1810 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1810 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 18, an exemplary environment 1810 for implementing various aspects of the invention includes a computer 1812. The computer 1812 includes a processing unit 1814, a system memory 1816, and a system bus 1818. The system bus 1818 couples system components including, but not limited to, the system memory 1816 to the processing unit 1814. The processing unit 1814 can be any of various available processors. Dual microprocessors and other multiprocessor architectures also can be employed as the processing unit 1814.

The system bus 1818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1816 includes volatile memory 1820 and nonvolatile memory 1822. The basic input/output system (BIOS), containing the basic routines to transfer information between elements within the computer 1812, such as during start-up, is stored in nonvolatile memory 1822. By way of illustration, and not limitation, nonvolatile memory 1822 can include read only memory (ROM), programmable ROM (PROM), electrically programmable ROM (EPROM), electrically erasable ROM (EEPROM), or flash memory. Volatile memory 1820 includes random access memory (RAM), which acts as external cache memory. By way of illustration and not limitation, RAM is available in many forms such as static RAM (SRAM), dynamic RAM (DRAM), static DRAM (SDRAM), double data rate SDRAM (DDR SDRAM), enhanced SDRAM (ESDRAM), Synchlink DRAM (SLDRAM), and direct Rambus (DRDRAM).

Computer 1812 also includes removable/nonremovable, volatile/nonvolatile computer storage media. FIG. 18 illustrates, for example a disk storage 1824. Disk storage 1824 includes, but is not limited to, devices like a magnetic disk drive, floppy disk drive, tape drive, Jaz drive, Zip drive, LS-100 drive, flash memory card, or memory stick. In addition, disk storage 1824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1824 to the system bus 1818, a removable or non-removable interface is typically used such as interface 1826.

It is to be appreciated that FIG. 18 describes software that acts as an intermediary between users and the basic computer resources described in suitable operating environment 1810. Such software includes an operating system 1828. Operating system 1828, which can be stored on disk storage 1824, acts to control and allocate resources of the computer system 1812. System applications 1830 take advantage of the management of resources by operating system 1828 through program modules 1832 and program data 1834 stored either in system memory 1816 or on disk storage 1824. It is to be appreciated that the subject invention can be implemented with various operating systems or combinations of operating systems.

A user enters commands or information into the computer 1812 through input device(s) 1836. Input devices 1836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1814 through the system bus 1818 via interface port(s) 1838. Interface port(s) 1838 include, for example, a serial port, a parallel port, a game port, and a universal serial bus (USB). Output device(s) 1840 use some of the same type of ports as input device(s) 1836. Thus, for example, a USB port may be used to provide input to computer 1812, and to output information from computer 1812 to an output device 1840. Output adapter 1842 is provided to illustrate that there are some output devices 1840 like monitors, speakers, and printers among other output devices 1840 that require special adapters. The output adapters 1842 include, by way of illustration and not limitation, video and sound cards that provide a means of connection between the output device 1840 and the system bus 1818. It should be noted that other devices and/or systems of devices provide both input and output capabilities such as remote computer(s) 1844.

Computer 1812 can operate in a networked environment using logical connections to one or more remote computers, such as remote computer(s) 1844. The remote computer(s) 1844 can be a personal computer, a server, a router, a network PC, a workstation, a microprocessor based appliance, a peer device or other common network node and the like, and typically includes many or all of the elements described relative to computer 1812. For purposes of brevity, only a memory storage device 1846 is illustrated with remote computer(s) 1844. Remote computer(s) 1844 is logically connected to computer 1812 through a network interface 1848 and then physically connected via communication connection 1850. Network interface 1848 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1850 refers to the hardware/software employed to connect the network interface 1848 to the bus 1818. While communication connection 1850 is shown for illustrative clarity inside computer 1812, it can also be external to computer 1812. The hardware/software necessary for connection to the network interface 1848 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented user interface that facilitates process monitoring comprising:
    one or more bands distributed across a display screen, the one or more bands comprising data corresponding to one or more processes;
    a simulation component implemented by a computer that incorporates at least one change into a process and simulates operation of the process to facilitate determining how the at least one change impacts the process;
    at least one context magnification control that exposes a contextualized view of at least a portion of the one or more bands, whereby the contextualized view is based in part on one or more selected parameters, wherein the parameters are weighted; and
    one or more navigation components implemented by the computer that control navigation and visualization of the one or more bands to facilitate viewing the one or more processes in real-time or near real-time.

2. The user interface of claim 1, the one or more processes comprise one or more activities and one or more objects.

3. The user interface of claim 2, at least one of the one or more activities and the one or more objects exhibit a color that indicates a cuffent state thereof.

4. The user interface of claim 1, the one or more bands comprise a plurality of sub-bands.

5. The user interface of claim 4, the one or more navigation components comprise a band expansion control that opens at least one band to expose the plurality of sub-bands.

6. The user interface of claim 4, the sub-bands comprise data corresponding to at least one of the following: one or more sub-processes, one or more activities, and one or more objects.

7. The user interface of claim 1, the one or more bands are distributed vertically or horizontally and adjacent to one another.

8. The user interface of claim 1, at least one band exhibits at least one color that indicates a current state of the at least one process.

9. The user interface of claim 1, the one or more navigation components provide toggle control between a state view and a process map view of at least one band or sub-band.

10. The user interface of claim 1, further comprising a band configuration component that configures the one or more bands with at least one process.

11. The user-interface of claim 1, the parameters comprise trend type, trend scope, magnification scale, and context scope of activities associated with the at least one process.

12. The user-interface of claim 1, the context magnification control provides a contextual zoom into at least one process, activity, event, or instance.

13. The user-interface of claim 1, further comprising a storage component that saves the context magnification control for re-use.

14. The user-interface of claim 1, further comprising an association component that permanently associates at least one context magnification control with one or more bands to automatically magnify the one or more band when selected.

15. The user-interface of claim 1, further comprising a view filter that filters contextually magnified views of the one or more bands.

16. A computer implemented user interface that facilitates process monitoring comprising:
   one or more bands distributed across a display screen, the one or more bands comprising data corresponding to one or more processes;
   a modification component implemented by a computer that suggests at least one change to optimize at least one process; and
   a simulation component implemented by the computer that incorporates the at least one change in the process and simulates operation of the process to facilitate determining how the at least one change impacts the process.

17. The user interface of claim 16, further comprising a display component that presents at least one view of the at least one process, the at least one view comprising a state view and a process map view.

18. The user interface of claim 16, the at least one process comprises at least one of the following: one or more activities, events, instances, and objects.

19. The user interface of claim 16, further comprising:
   a navigation component that allows a user to move or copy at least a portion of the process into another process or to a different portion of the same process; and
   an integration component that implements such change to the process in real-time or near real-time.

20. The user interface of claim 16, further comprising an incremental view filter that alters the view of the at least one process or portion thereof by displaying various amounts or types of information based on one or more selected parameters.

21. A computer implemented user interface that facilitates process monitoring comprising:
   one or more bands distributed across a display screen, the one or more bands comprising data corresponding to one or more processes;
   a simulation component implemented by a computer that incorporates at least one modification into at least one process and simulates real-time operation of the process to facilitate determining how the at least one modification impacts the process; and
   one or more navigation components implemented by the computer that control navigation and visualization of the one or more bands to facilitate viewing the one or more processes in real-time or near real-time.

* * * * *

UNITED STATES PATENT AND TRADEMARK OFFICE
CERTIFICATE OF CORRECTION

PATENT NO. : 7,479,970 B2  
APPLICATION NO. : 11/137943  
DATED : January 20, 2009  
INVENTOR(S) : Curtis Christman et al.

Page 1 of 1

It is certified that error appears in the above-identified patent and that said Letters Patent is hereby corrected as shown below:

In column 1, line 10, delete "11/034,316" and insert -- 11/034,136 --, therefor.

In column 1, lines 14-15, delete "ACHITECTURE" and insert -- ARCHITECTURE --, therefor.

In column 1, lines 15-16, delete "VISULAZATION" and insert -- VISUALIZATION --, therefor.

In column 1, line 19, delete "LINED" and insert -- LINE --, therefor.

In column 14, line 65, in Claim 3, delete "cuffent" and insert -- current --, therefor.

Signed and Sealed this  
Third Day of May, 2011

David J. Kappos  
*Director of the United States Patent and Trademark Office*